(12) United States Patent
Deng (10) Patent No.: US 7,508,800 B1
(45) Date of Patent: Mar. 24, 2009

(54) BLOCK CODE MAPPING SYSTEM AND METHOD

(75) Inventor: Yu Deng, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1121 days.

(21) Appl. No.: 10/152,929

(22) Filed: May 22, 2002

(51) Int. Cl.
*H04B 7/216* (2006.01)
*H04Q 7/24* (2006.01)
*H04J 3/16* (2006.01)
*H04J 3/24* (2006.01)

(52) U.S. Cl. .................. 370/338; 370/342; 370/466; 370/473

(58) Field of Classification Search ......... 370/470–472, 370/539
See application file for complete search history.

(56) References Cited

U.S. PATENT DOCUMENTS

| | | | |
|---|---|---|---|
| 6,295,010 B1 * | 9/2001 | Thiesfeld | 341/58 |
| 6,628,725 B1 * | 9/2003 | Adam et al. | 375/259 |
| 6,654,370 B1 * | 11/2003 | Quirke et al. | 370/389 |
| 6,674,754 B1 * | 1/2004 | Ofek | 370/389 |
| 6,775,799 B1 * | 8/2004 | Giorgetta et al. | 714/751 |
| 6,822,976 B1 * | 11/2004 | Riesenman et al. | 370/539 |
| 6,952,405 B2 * | 10/2005 | Tsang et al. | 370/252 |
| 2002/0080828 A1 * | 6/2002 | Ofek et al. | 370/539 |

OTHER PUBLICATIONS

American National Standard for Telecommunications, "Generic Framing Procedure", May 2001.

* cited by examiner

*Primary Examiner*—Melanie Jagannathan
(74) *Attorney, Agent, or Firm*—Cindy Kaplan (57) ABSTRACT

A method of mapping coded data for communication within a network is disclosed. The method includes receiving an 8b/10b source protocol data stream and converting the data stream into a plurality of 33-bit code groups. Each of the 33-bit code groups contains four bytes of data and one control bit. The method further includes forming a 33-byte block comprising eight of the 33-bit code groups.

20 Claims, 7 Drawing Sheets

PRIOR ART

BLOCK CODE MAPPING SYSTEM AND METHOD

BACKGROUND OF THE INVENTION

The present invention relates generally to communication networks, and more specifically, to a 32b/33b block code mapping for Fibre Channel.

Wavelength Division Multiplexing (WDM) is an optical technology that couples many wavelengths in the same fiber, thus effectively increasing the aggregate bandwidth per fiber to the sum of the bit rates of each wavelength. Dense WDM (DWDM) is a technology with a larger (denser) number of wavelengths (e.g., >40) coupled into a fiber than WDM. Systems may support, for example, 100 wavelengths per fiber, enabling a single fiber to carry several hundred gigabits of information. DWDM increases the capacity of embedded fiber by first assigning incoming optical signals to specific frequencies within a designated frequency band and then multiplexing the resulting signals out onto one fiber. DWDM combines multiple optical signals so that they can be amplified as a group and transported over a single fiber to increase capacity. Each signal can be at a different rate and in a different format. DWDM applications include ultra-high bandwidth long haul as well as ultra-high-speed metropolitan or inner city-networks, and at the edge of other networks such as SONET, Internet protocol (IP) and asynchronous transfer mode (ATM).

In conventional DWDM applications, many different protocols need to be aggregated into a single data channel to be transported over a wavelength. For example, a single 10 Gigabit DWDM channel can carry multiple lower-speed source application protocols such as ESCON (200M), Fibre Channel (FC) (1.0625G) or Gigabit Ethernet (GE) (1.25G), and multiple channels of those protocols need to be converged to one transport interconnect signal, such as the 10 Gigabit Ethernet (IEEE 802.3.ae) or SONET (OC-48, OC-192), which are the most prominent choices for DWDM technology.

Communication systems transmit signals by means of a number of coding techniques. The 8b/10b code translates 8 bits into one of predetermined 10-bit codes. The extra two bits of code serve a variety of purposes, including differentiating control blocks from data blocks, error detection (disparity control), frame delimiting with data transparency, DC voltage balance, and transitions for clock recovery. An 8b/10b encoder is used to convert 8b data into 10b data. 8b/10b encoding is used in transmitting data on Fibre Channel, ESCON (Enterprise Serial Connection), and Gigabit Ethernet, for example.

Figure 1:
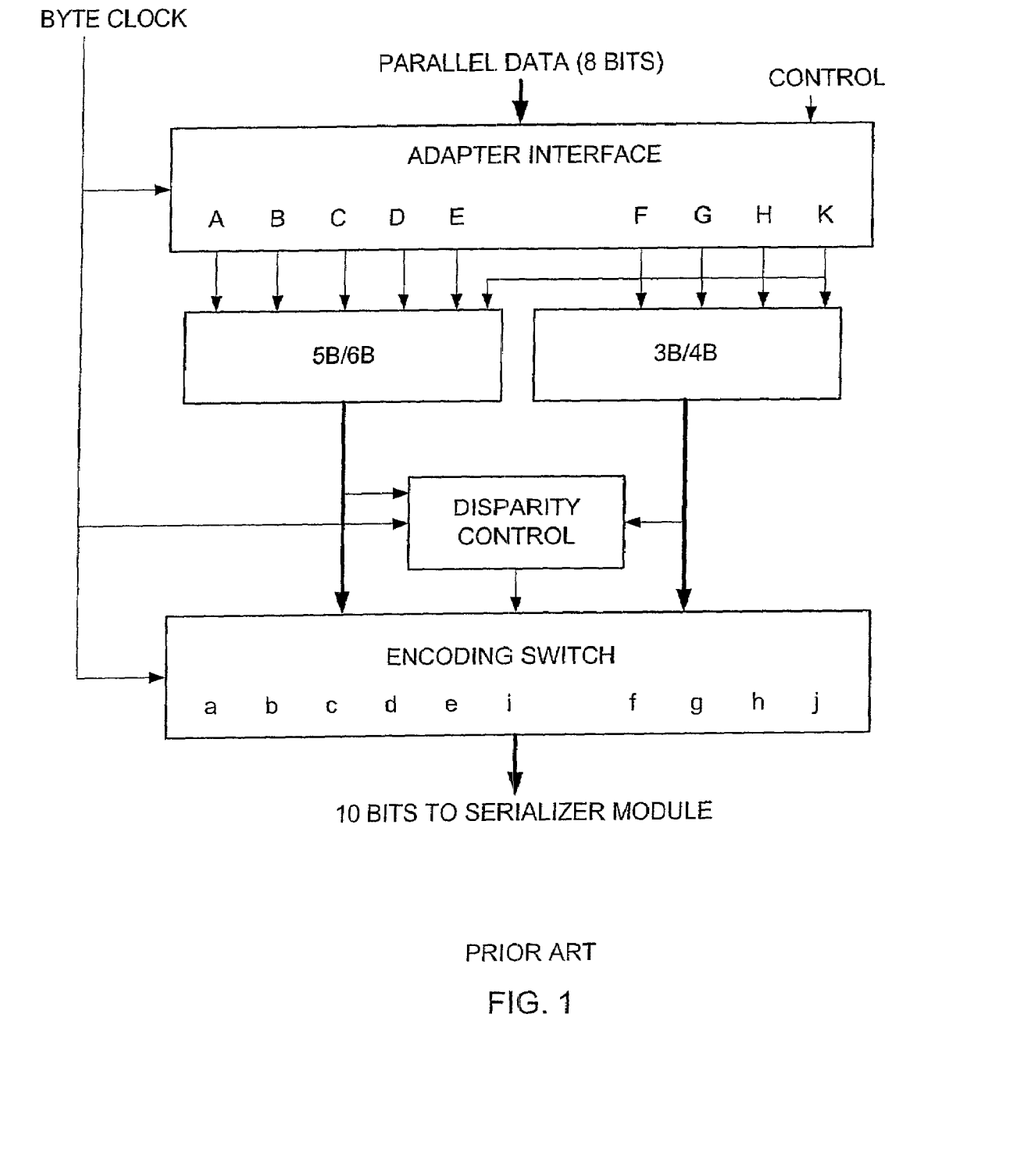
FIG. 1 is a diagram illustrating a prior art 8b/10b coding scheme.

FIG. 1 illustrates operation of the 8b/10b code. The code combines a 5b/6b code and a 3b/4b code. A mapping is defined that maps each of the possible 8-bit source blocks into a 10-bit code block. There is also a function called disparity control that keeps track of the excess of zeros over ones or ones over zeros. The unencoded input includes 8 bits (A, B, C, D, E, F, G, H) and a control variable. The control line input indicates whether lines A through H are data or control bits. The input information is encoded into bits (a, b, c, d, e, f, g, h, i, j) of a 10-bit transmission character. The control variable is either a "D" for data characters or a "K" for special characters. Each valid transmission character is given a name using the following convention: Kxx.y, where K is the control variable of the unencoded information byte, xx is the decimal value of the binary number composed of the bits E, D, C, B, and A, and y is the decimal value of the binary number composed of the bits H, G of the unencoded information byte. The information received is recovered 10 bits at a time and those transmission characters used for data are decoded into one of the 256 8-bit combinations. Some of the remaining transmission characters are used for protocol management functions.

Since the DWDM protocol of either Gigabit Ethernet or SONET is different from the source application protocols, one way to converge the application protocols is to participate the protocol and terminate the application at the connecting node and regenerate the application protocol at the other end. This, however, involves complicated and expensive system designs. A more efficient method is to perform a transparent interconnect, so that the application protocol data is directly carried through Gigabit Ethernet or SONET. In DWDM applications where very low transmission latency is required, transparent transport of 8b/10b block coded client signals is preferred.

SRI International and Stanford University have jointly developed the Generic Frame Protocol (GFP), which defines a very complicated 64b/65b block coding scheme to facilitate the transparent mapping of general purpose 8b/10b coded payloads into GFP. For transport of Fibre Channel signals over Gigabit Ethernet or SONET, users are currently using the 64b/65b GFP, which is complex, or attempting to use their own complicated proprietary solutions.

SUMMARY OF THE INVENTION

A method of mapping coded data for communication within a network is disclosed. The method includes receiving an 8b/10b source protocol data stream and converting the data stream into a plurality of 33-bit code groups. Each of the 33-bit code groups contains four bytes of data and one control bit. The method further includes forming a 33-byte block comprising eight of the 33-bit code groups.

In another aspect of the invention, a system for mapping coded data generally comprises a processor operable to receive an 8b/10b source protocol data stream, convert the data stream into a plurality of 33-bit code groups each containing four bytes of data and one control bit, and form a 33-byte block comprising eight of the 33-bit code groups.

A computer program product for mapping coded data for communication within a network generally comprises code that receives an 8b/10b source protocol data stream and converts the data stream into a plurality of 33-bit code groups each containing four bytes of data and one control bit. The product further includes code that forms a 33-byte block comprising eight of the 33-bit code groups and a computer-readable storage medium for storing the codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. A system of the present invention provides an efficient, low-latency coding scheme for mapping 8b/10b based protocols over a DWDM network. The network may be configured to use protocols such as Fibre Channel or Gigabit Ethernet, for example.

Figure 2:
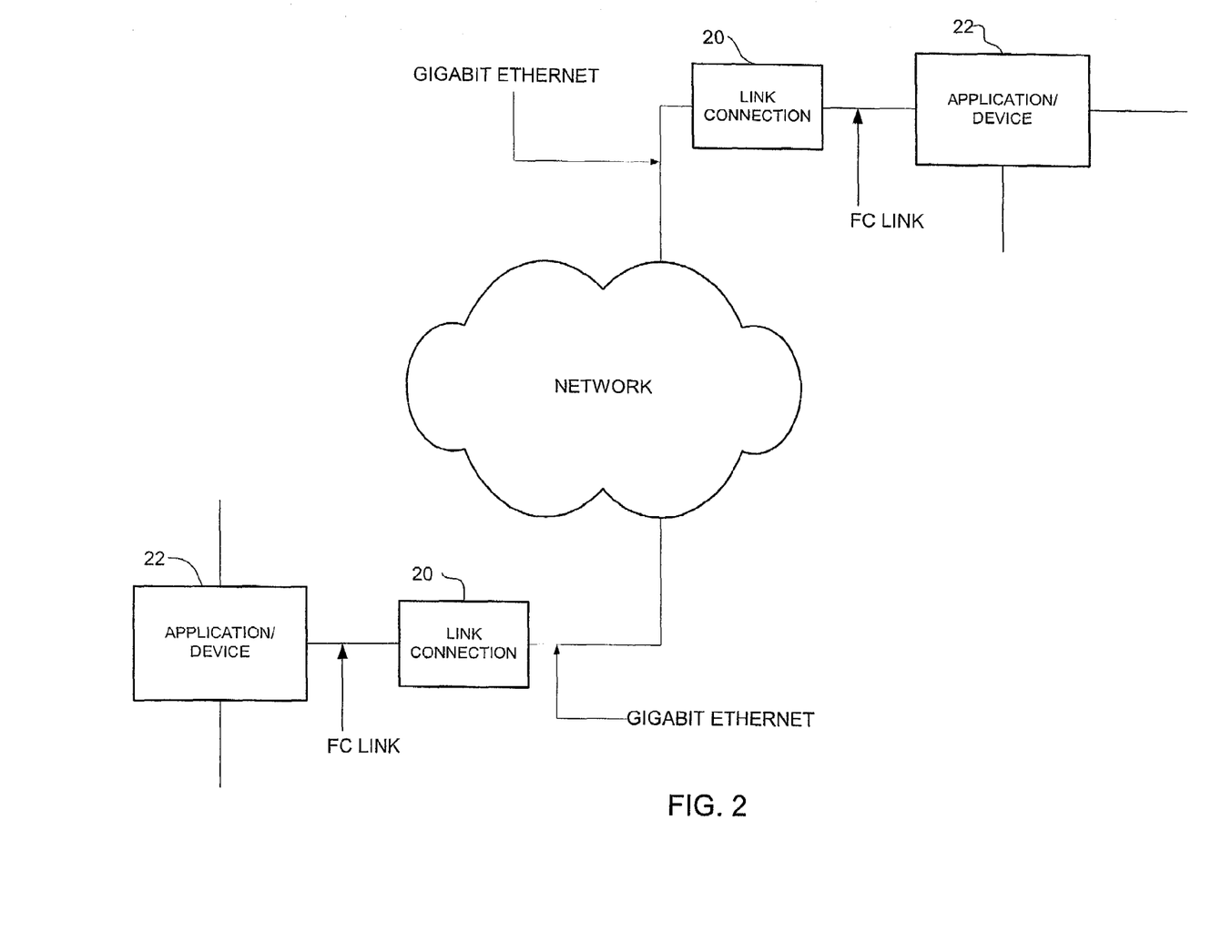
FIG. 2 is diagram illustrating exemplary link connections in a Fibre Channel application.

Referring now to the drawings, and first to FIG. 2, a link connection 20 of the present invention may provide interconnection for Fibre Channel to Gigabit Ethernet on a user Gigabit medium independent interface, for example. The connection is transparent to users, applications, and other upper layer protocols of the Fibre Channel links. An application or device 22 sends data over the Fibre Channel link to a Gigabit Ethernet channel that can carry multiple lower-speed source application protocols. The 10-bit code of the 8b/10b scheme is used by Fibre Channel as part of the protocol signaling. Since the 10-bit control characters are a part of the protocols, they must be carried through as well as the user data.

The 8b/10b code provides a potential 1024 code words for signaling. A convention of KID with numbers is used to indicate the data. The 8-bit 256 user data is represented by Dxx.y, other control codes are represented by Kxx.y where xx is from 0 to 31 and y is from 0 to 7. For example, D28.5 represents 10b code 0011110010 or 1100000010 depending on the code disparity. The 8b/10b based protocol uses a 10-bit domain data as a part of the protocol signaling called ordered set. An ordered set is a 4-byte transmission word which has a special character as its first transmission character. An ordered set may be a frame delimiter, a primitive signal, or a primitive sequence. Ordered sets are used to distinguish control information from data. In Fibre Channel, the ordered set has four symbols. For example, IDLE consists of K28.5+ D21.4+D21.5+D21.5. The ordered set may be any number and combination of K and D symbols.

The Fibre Channel 8b/10b coded signal is 4-byte aligned. In every aligned 4 bytes block only the first byte can be a control character. Thus, in the decoded 8b/10b data stream, for every aligned 4 bytes (32 bits) data block, only a single bit is needed to identify whether or not its first byte is a control character.

Figure 3:
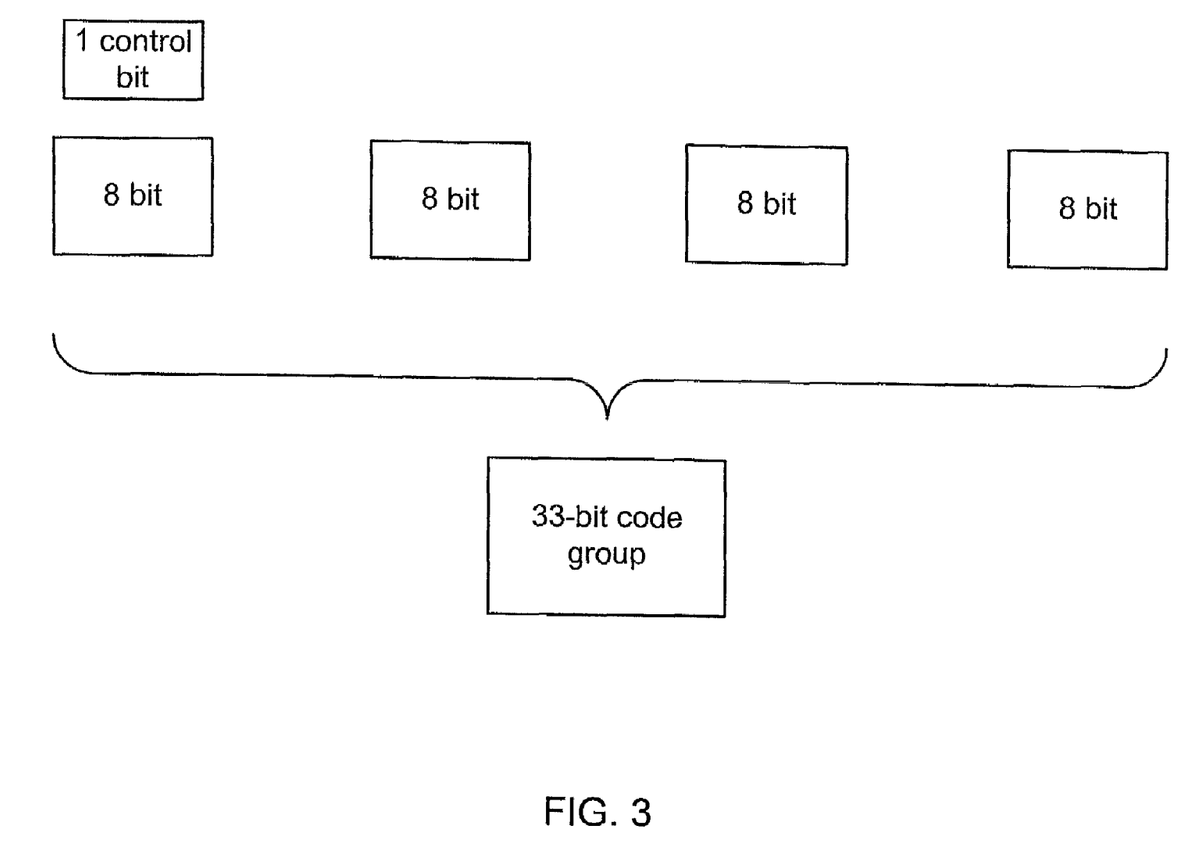
FIG. 3 is a diagram illustrating formation of a 33-bit code group from 8b/10b decoded four-byte aligned data.
Figure 4:
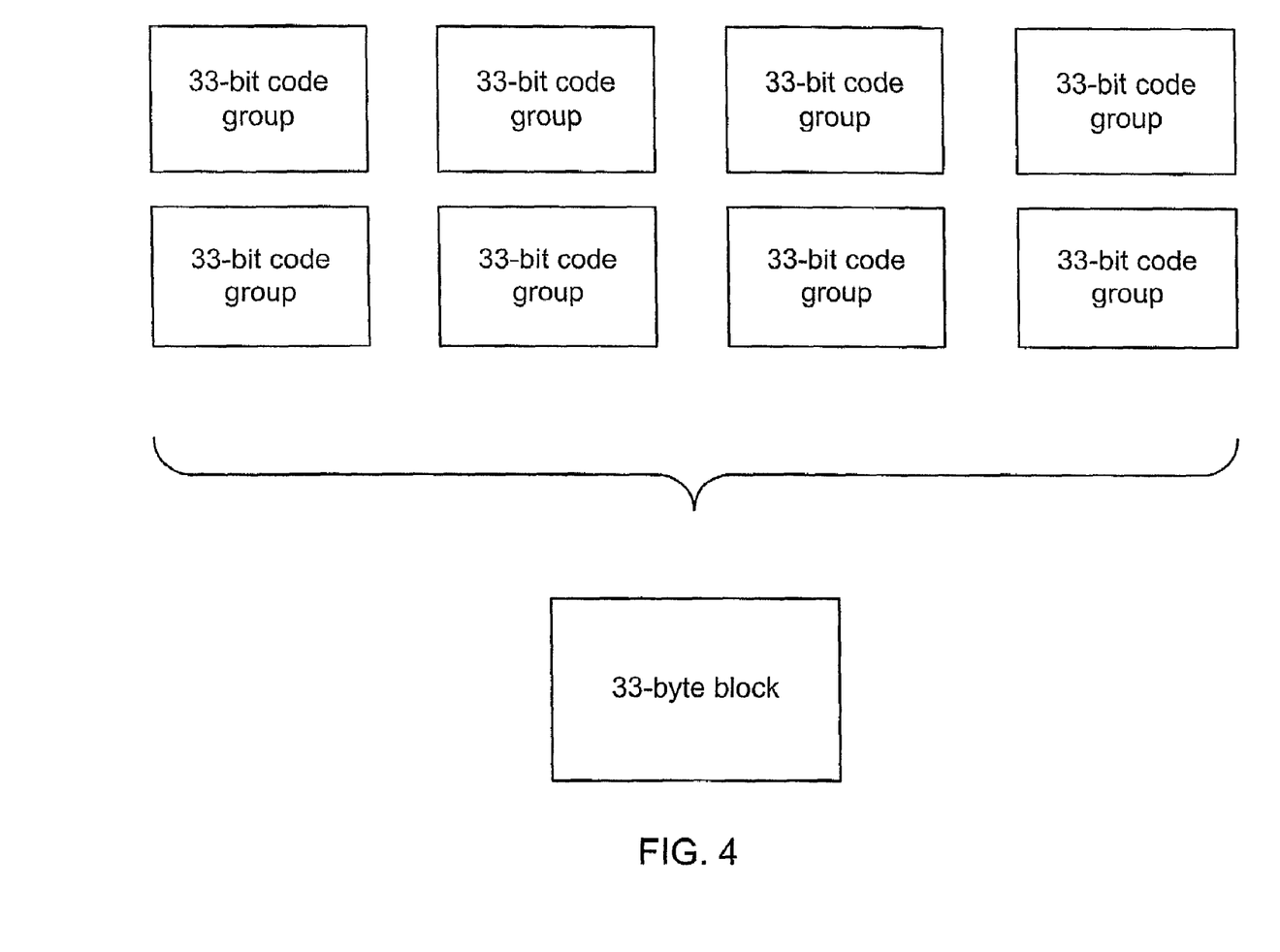
FIG. 4 is a diagram illustrating formation of a 33-byte block from the 33-bit code groups.
Figure 5:
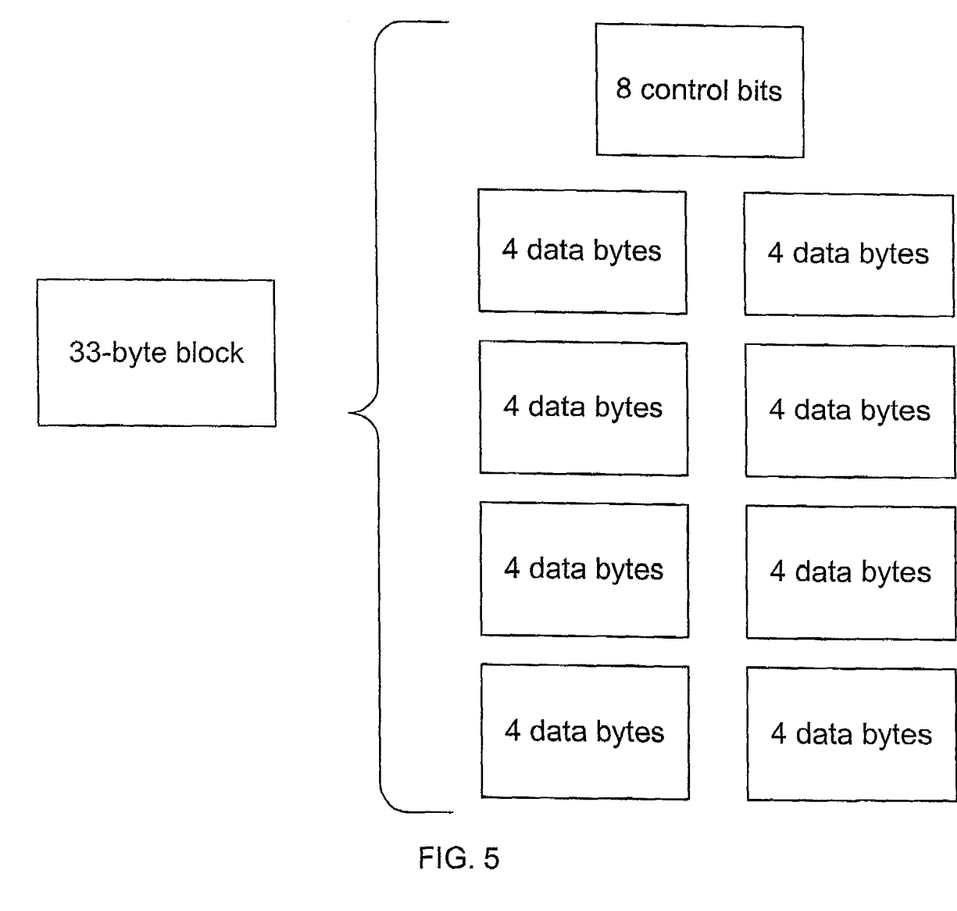
FIG. 5 is a diagram illustrating contents of the 33-byte block.

The 8b/10b decoded 4-byte (32 bits) aligned Fibre Channel data is mapped into a 33-bit code group. Four bytes of data directly copy from Fibre Channel data and a one bit control flag is copied from the first byte (FIG. 3). As shown in FIG. 4, eight 33-bit code groups construct a 33-byte block. FIG. 5 shows the contents of the newly formed 33-byte block. The first byte of the 33-byte block consists of eight control bits:

bit 0 is the control bit of the $1^{st}$ 33-bit group;
bit 1 is the control bit of the $2^{nd}$ 33-bit group;
bit 2 is the control bit of the $3^{rd}$ 33-bit group;
bit 3 is the control bit of the $4^{th}$ 33-bit group;
bit 4 is the control bit of the $5^{th}$ 33-bit group;
bit 5 is the control bit of the $6^{th}$ 33-bit group;
bit 6 is the control bit of the $7^{th}$ 33-bit group; and
bit 7 is the control bit of the $8^{th}$ 33-bit group.

In addition:

The $2^{nd}$ to $5^{th}$ bytes of the 33-byte block are the 4 data bytes of the 1st 33-bit group;

$6^{th}$ to $9^{th}$ bytes of the 33-byte block are the 4 data bytes of the $2^{nd}$ 33-bit group;

$10^{th}$ to $13^{th}$ bytes of the 33-byte block are the 4 data bytes of the $3^{rd}$ 33-bit group;

$14^{th}$ to $17^{th}$ bytes of the 33-byte block are the 4 data bytes of the $4^{th}$ 33-bit group;

$18^{th}$ to $21^{st}$ bytes of the 33-byte block are the 4 data bytes of the $5^{th}$ 33-bit group;

$22^{nd}$ to $25^{th}$ bytes of the 33-byte block are the 4 data bytes of the $6^{th}$ 33-bit group;

$26^{th}$ to $29^{th}$ bytes of the 33-byte block are the 4 data bytes of the $7^{th}$ 33-bit group; and $30^{th}$ to 33rd bytes of the 33-byte block are the 4 data bytes of the $8^{th}$ 33-bit group.

Based on the transport layer bandwidth, N 33-byte blocks are assembled into an Ethernet packet. For example, if the transporting layer is Gigabit Ethernet, N is set equal to 9 or 10. By selecting a different value of N, the same scheme can support 1 FC-1x over GE, 10 FC-1x, or 5 FC-2x over 10GE or OC192, 2FC-1x or 1 FC-2x over OC48, for example.

Figure 6:
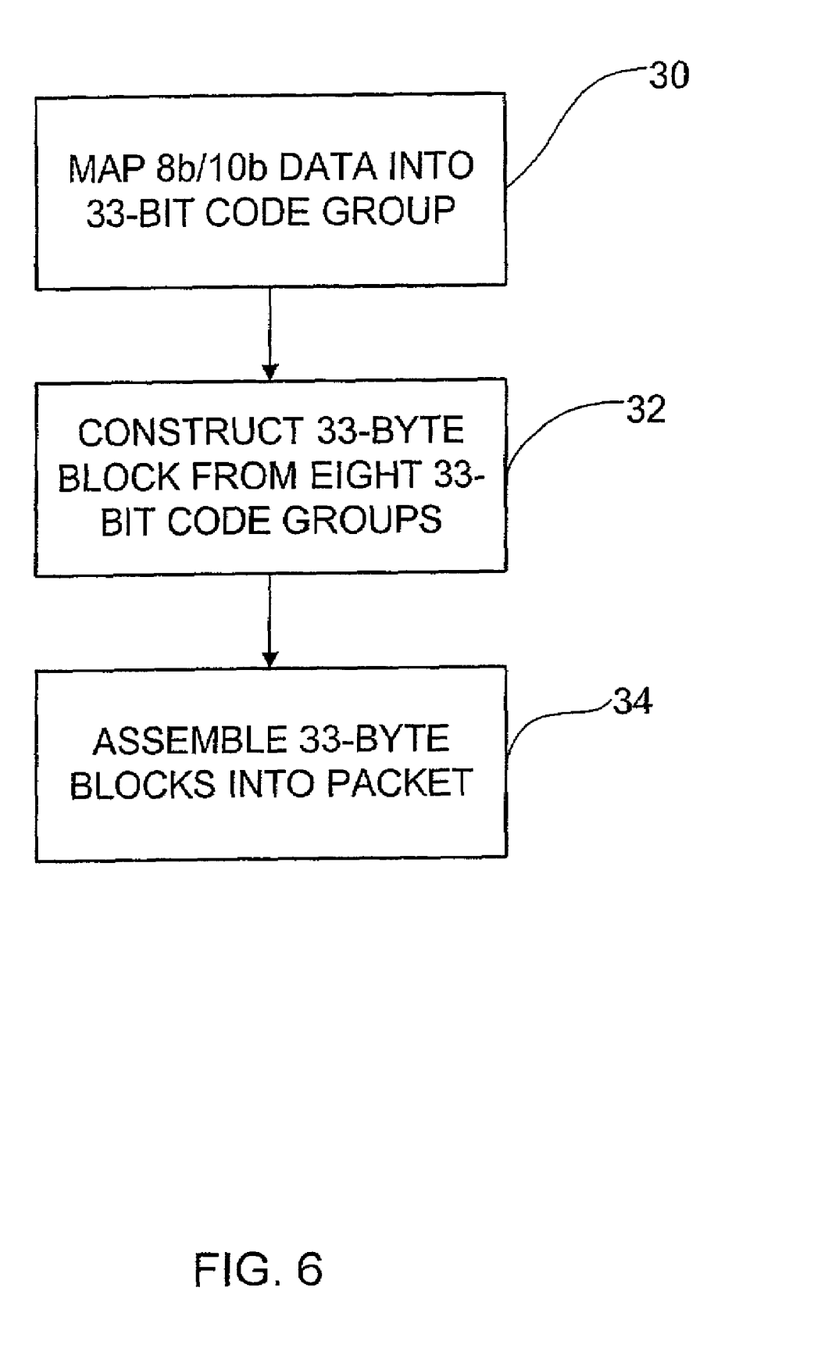
FIG. 6 is a flowchart illustrating a process of the present invention for using a 32b/33b block code mapping for Fibre Channel.

FIG. 6 is a flowchart illustrating a process of the present invention for using 32b/33b block code mapping for Fiber Channel over Gigabit Ethernet or SONET encapsulation. The 8b/10b 4-byte aligned Fibre channel data is first mapped into a 33-bit code group (step 30) (FIGS. 3 and 6). A 33-byte block is then constructed with eight of the 33-bit code groups (step 32) (FIGS. 4 and 6). N 33-byte blocks are assembled into an Ethernet packet (step 34).

It is to be understood that the block coding scheme of the present invention may be used with protocols other than Fibre Channel, without departing from the scope of the invention. Furthermore, the system and method of the present invention may be used for data aggregation of coding protocols other than 8b/10b.

Figure 7:
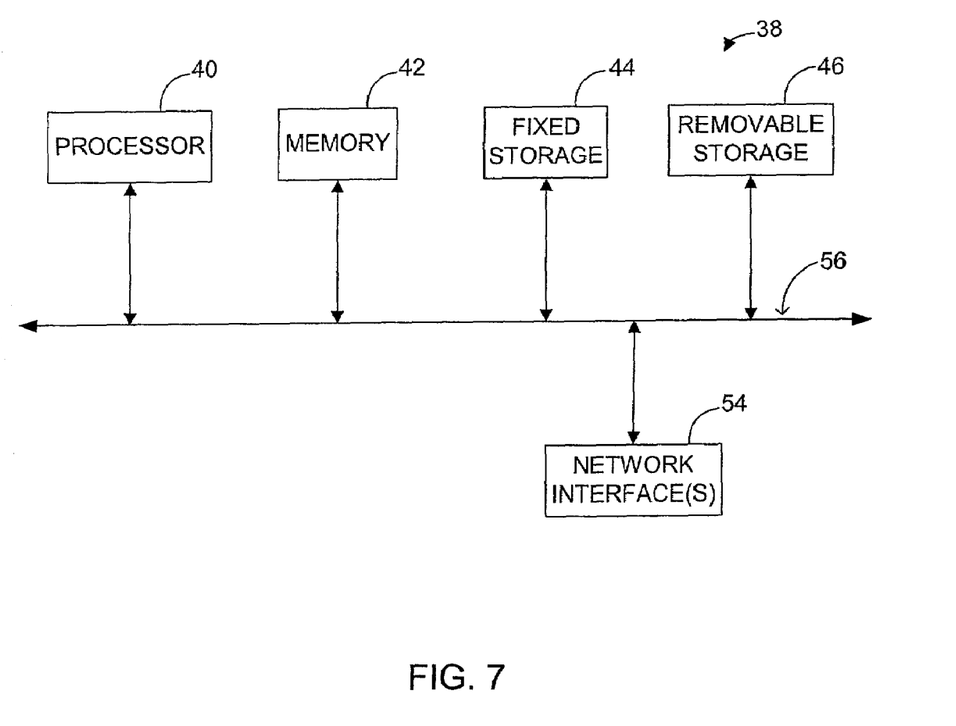
FIG. 7 is a system block diagram of a computer system that can be utilized to execute software of an embodiment of the present invention.

FIG. 7 shows a system block diagram of computer system 38 that may be used to execute software of an embodiment of the invention. The computer system 38 includes memory 42 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 38 further includes subsystems such as a central processor 40, fixed storage 44, removable storage 46, and one or more network interfaces 54. Other computer systems suitable for use with the invention may include additional or fewer subsystems.

The system bus architecture of computer system 38 is represented by arrows 56 in FIG. 7. However, these arrows are only illustrative of one possible interconnection scheme serving to link the subsystems. For example, a local bus may be utilized to connect the central processor 40 to the system memory 42. Computer system 38 shown in FIG. 7 is only one example of a computer system suitable for use with the invention. Other computer architectures having different configurations of subsystems may also be utilized. Communication between computers within the network is made possible with the use of communication protocols, which govern how computers exchange information over a network.

As can be observed from the foregoing, the present invention has numerous advantages. The system is less complex than the 64b/65b GFP, thus reducing gate count and implementation costs. The system further provides reduced latency for large Fibre Channel packets since there is no need to wait for the EOF of the Fibre Channel packet on the encapsulation side.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method of mapping coded data for communication within a network, the method comprising:
   receiving an 8b/10b Fibre Channel source protocol data stream by a processor;
   converting the data stream into a plurality of 33-bit code groups each containing four bytes of data and one control bit by said processor;
   forming one or more 33-byte blocks each comprising eight of said plurality of 33-bit code groups by said processor;
   selecting a number of said 33-byte blocks to form based on a protocol of a transport layer by said processor; and
   transporting a 32b/33b data stream comprising said selected number of said 33-byte blocks by said processor over said transport layer;
   wherein forming said 33-byte block comprises copying four bytes of data directly from said converted data stream and a one bit control flag from a first byte of said converted data stream.

2. The method of claim 1 wherein the 8b/10b source protocol data stream is 4-byte aligned.

3. The method of claim 1 further comprising assembling the 33-byte blocks into an Ethernet packet.

4. The method of claim 3 wherein said transport layer of the network is Gigabit Ethernet and assembling the 33-byte blocks comprises assembling nine or ten 33-byte blocks.

5. The method of claim 1 wherein the number of said 33-byte blocks selected if said transport layer is Gigabit Ethernet is different than the number of said 33-byte blocks selected if said transport layer is SONET.

6. The method of claim 1 wherein said transport layer is SONET.

7. The method of claim 1 wherein converting the data stream comprises directly copying four bytes of data from Fibre Channel data and a one bit control flag from a first byte in the source protocol data stream.

8. A system for mapping coded data for communication within a network, the system comprising a processor operable to receive an 8b/10b Fibre Channel source protocol data stream, convert the data stream into plurality of 33-bit code groups each containing four bytes of data and one control bit, form one or more 33-byte blocks each comprising eight of said plurality of 33-bit code groups; select a number of said 33-byte blocks to form based on a protocol of a transport layer; and transport a 32b/33b data stream comprising said selected number of said 33-byte blocks over said transport layer; wherein forming said 33-byte block comprises copying four bytes of data directly from said converted data stream and a one bit control flag from a first byte of said converted data stream.

9. The system of claim 8 wherein the 8b/10b source protocol data stream is 4-byte aligned.

10. The system of claim 8 further comprising memory for at least temporarily storing said 8b/10b source protocol data stream.

11. The system of claim 8 wherein said processor is operable to assemble one or more of said 33-byte blocks into an Ethernet packet.

12. The system of claim 11 wherein the number of said 33-byte blocks is selected based on a protocol utilized at a network receiving said packet.

13. The system of claim 8 wherein a first byte of said 33-byte block comprises eight control bits and remaining bytes comprise data bytes.

14. A computer program product including executable codes embedded in a computer-readable storage medium for mapping coded data for communication within a network, the product comprising:
   code that receives an 8b/10b Fibre Channel source protocol data stream;
   code that converts the data stream into a plurality of 33-bit code groups each containing four bytes of data and one control bit;
   code that forms one or more 33-byte blocks each comprising eight of said plurality of 33-bit code groups;
   code that selects a number of said 33-byte blocks to form based on a protocol of a transport layer;
   code that transports a 32b/33b data stream comprising said selected number of said 33-byte blocks over said transport layer; and
   a computer-readable storage medium for storing said codes;
   wherein forming said 33-byte block comprises copying four bytes of data directly from said converted data stream and a one bit control flag from a first byte of said converted data stream.

15. The product of claim 14 wherein the 8b/10b source protocol data stream is 4-byte aligned.

16. The product of claim 14 further comprising code that assembles the 33-byte blocks into an Ethernet packet.

17. The product of claim 16 wherein said transport layer is Gigabit Ethernet and code that assembles the 33-byte blocks comprises code that assembles nine or ten 33-byte blocks.

18. An apparatus for mapping coded data for communication within a network, the apparatus comprising:
   means for receiving an 8b/10b Fibre Channel source protocol data stream;
   means for converting the data stream into a plurality of 33-bit code groups each containing four bytes of data and one control bit;
   means for forming one or more 33-byte blocks each comprising eight of said plurality of 33-bit code groups;
   means for selecting a number of said 33-byte blocks to form based on a protocol of a transport layer; and means for transporting a 32b/33b data stream comprising said selected number of said 33-byte blocks over said transport layer;

wherein forming said 33-byte block comprises copying four bytes of data directly from said converted data stream and a one bit control flag from a first byte of said converted data stream.

19. The apparatus of claim 18 wherein said transport layer is Gigabit Ethernet and means for forming the 33-byte blocks comprises assembling nine or ten 33-byte blocks.

20. The apparatus of claim 18 wherein the number of said 33-byte blocks is selected based on a protocol utilized at a network receiving said packet.

* * * * *